Patented Aug. 13, 1940

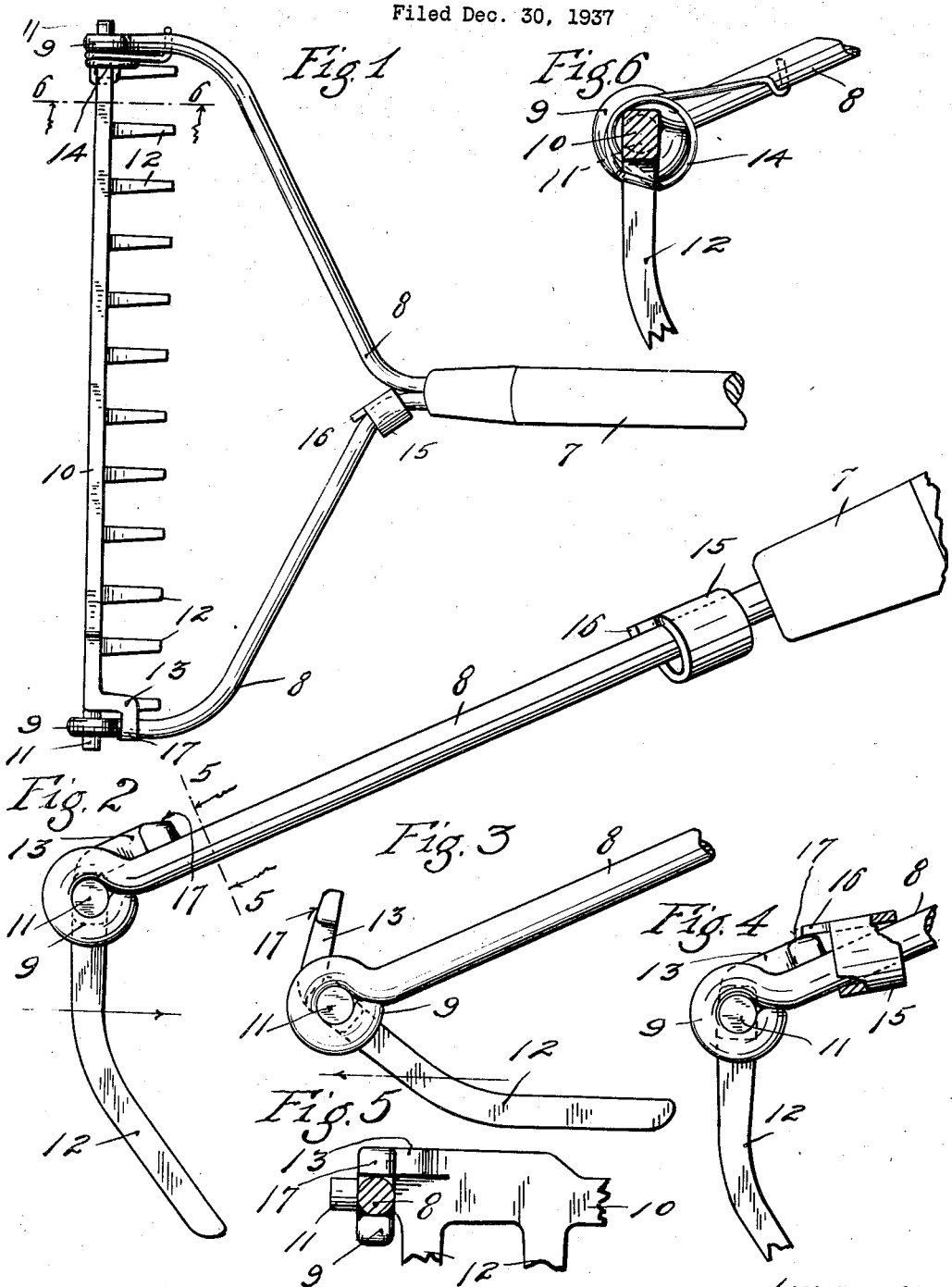

2,211,236

UNITED STATES PATENT OFFICE 2,211,236

SELF-CLEANING RAKE

John R. Kunzelman, Stillwater, Minn.

Application December 30, 1937, Serial No. 182,536

1 Claim. (Cl. 56—400.20)

My invention relates to rakes generally known as garden rakes, and more particularly, to rakes of the self-cleaning type.

As is well known, when raking trash, and particularly leaves, it is necessary to frequently stop raking and remove, by hand, leaves held on and between the teeth of the rake, which is not only annoying but requires a good deal of time, and hence makes the operation slow and tedious.

The object of this invention is to pivotally attach a rake head to a handle in a manner in which movement of the rake handle away from the operator, while the points of the teeth are resting on the ground, will cause the rake head to fold toward the operator and position the teeth longitudinally on the ground. A continued movement of the rake in this same direction for a very short distance will strip the leaves from the teeth by their frictional engagement with the ground. The invention further provides yielding means for returning the rake head to normal position as soon as pressure on the rake handle, away from the operator, is removed, thus causing very little delay and effort in removing leaves or other trash from the rake. Further means, operative at will, is provided for locking the rake head against hinge-like movement, whereby the rake may be used for general raking purposes in which movement thereof toward and from the operator is required.

To the above end, generally stated, the invention consists of the novel devices, combinations of devices and arrangement of parts hereinafter described and defined in the claim.

In the accompanying drawing, which illustrates the invention, like characters indicate like parts throughout the several views.

Referring to the drawing:

Fig. 1 is a plan view of the improved rake with a portion of the handle broken away;

Fig. 2 is a side elevation of the improved rake as shown in Fig. 1, on an enlarged scale;

Fig. 3 is a view corresponding to Fig. 2, with the exception that the rake head is turned into its stripping position;

Fig. 4 is also a view corresponding to Fig. 2, with the exception that the rake head is locked against hinge-like movement;

Fig. 5 is a fragmentary view partly in elevation and partly in section, taken on the line 5—5 of Fig. 2; and Fig. 6 is a fragmentary detail view partly in elevation and partly in section taken on the line 6—6 of Fig. 1, on an enlarged scale.

The numeral 7 indicates a wooden handle having at one end a pair of fixed and diverging metallic arms 8, the free end portions of which are parallel and terminate in eyes or bearings 9.

The rake head includes a back or horizontal member 10, the ends of which terminate in trunions 11 journaled in the bearings 9. Integral with the under side of the back 10 is a plurality of depending teeth 12, which are intermediately curved with their free end portions extending downwardly and rearwardly.

To prevent forwardly swinging movement of the rake head from normal position, the same is provided with an L-shaped stop finger 13. This stop finger 13 is at the left-hand end of the back 10, with which it is integrally formed, and its free end portion overlies the respective arm 8, which arm acts as an abutment to limit forward swinging movement of the rake head.

A coiled spring 14, encircling the right-hand end portion of the back 10, has one of its ends anchored to the adjacent arm 8 and its other end anchored to the adjacent tooth 12. This spring 14 is under strain to swing the rake head forward until stopped by the engagement of the stop finger 13 with the respective arm 8.

To lock the rake head against pivotal movement, there is provided a thimble 15, loosely and slidably mounted on the left-hand arm 8, having on its outer end a lug 16 arranged to extend over the stop finger 13 and hold the same pressed against the respective arm 8.

By reference to Fig. 4, it will be noted that the thimble 15 and its lug 16 have three-point contact with the arm 8 and the stop finger 13, and thereby frictionally hold said thimble in an operative position. It will also be noted that the stop finger 13 has a cam surface 17 onto which the lug 16 may be pressed with a variable pressure. This cam surface 17 will also compensate for wear between the cam surface and the lug 16. When the thimble 15 is not in use, the same may be frictionally held in the crotch between the arms 8, as shown in Fig. 1.

From the above description, it is evident that when the rake is drawn in the direction of the arrow on Fig. 2, the rake head will be rigidly held by the stop finger 13. A movement of the rake in the direction of the arrow on Fig. 3, will cause the rake head to fold under the arms 8 and thereby bring the free end portions of the teeth 12 parallel or substantially parallel with the ground, so that leaves or other trash thereon will be removed by pushing the rake over the ground in the direction of said arrow. When forward pressure is removed from the rake, the tensioned spring 14 will swing the rake head forward into an operative position, so that raking operation may be continued.

It will be understood that the invention described is capable of various modifications within the scope of the invention herein disclosed and claimed.

What I claim is:

A rake comprising a handle having at one end a pair of diverging arms, a tooth-equipped rake head pivoted to said arms, a fixed stop member on the rake head arranged to engage one of the arms and position the rake head in an operative position with freedom for turning movement into a position in which its teeth extend rearwardly in substantially a horizontal stripping position, a spring normally holding the rake head with its stop member in engagement with said arm, and a thimble slidably mounted on one of the arms and having a lug arranged to engage the stop member and hold the same on said arm.

JOHN R. KUNZELMAN.